(12) United States Patent
Dumoulin

(10) Patent No.: US 9,121,695 B2
(45) Date of Patent: Sep. 1, 2015

(54) MULTI PSD-ARRANGEMENT AND CIRCUITRY

(75) Inventor: Charles Leopold Elisabeth Dumoulin, Balgach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 40 days.

(21) Appl. No.: 14/238,834

(22) PCT Filed: Aug. 14, 2012

(86) PCT No.: PCT/EP2012/065916
§ 371 (c)(1),
(2), (4) Date: Feb. 13, 2014

(87) PCT Pub. No.: WO2013/024102
PCT Pub. Date: Feb. 21, 2013

(65) Prior Publication Data
US 2014/0204399 A1    Jul. 24, 2014

(30) Foreign Application Priority Data
Aug. 16, 2011   (EP) .................................... 11177645

(51) Int. Cl.
*G01B 11/14*   (2006.01)
*G01J 1/42*    (2006.01)
*G01C 15/00*   (2006.01)
*G01J 1/44*    (2006.01)

(52) U.S. Cl.
CPC .............. *G01B 11/14* (2013.01); *G01C 15/006* (2013.01); *G01J 1/4257* (2013.01); *G01J 1/44* (2013.01)

(58) Field of Classification Search
CPC ........ G01J 1/4257; G01J 1/44; G01C 15/006; G01B 11/14
USPC .......................................... 356/614, 615, 623
See application file for complete search history.

(56) References Cited

U.S. PATENT DOCUMENTS

| | | |
|---|---|---|
| 3,649,122 A | 3/1972 | Holtz |
| 3,894,230 A | 7/1975 | Rorden et al. |
| 4,589,773 A * | 5/1986 | Ido et al. ........................ 356/623 |
| 4,676,634 A | 6/1987 | Petersen |
| 4,756,617 A | 7/1988 | Cain et al. |

(Continued)

FOREIGN PATENT DOCUMENTS

| | | |
|---|---|---|
| DE | 195 40 590 A1 | 4/1996 |
| EP | 0 823 615 A2 | 2/1998 |

(Continued)

OTHER PUBLICATIONS

European Search Report dated Feb. 10, 2012 as received in Application No. EP 11 17 7645.

*Primary Examiner* — Roy M Punnoose
(74) *Attorney, Agent, or Firm* — Maschoff Brennan

(57) ABSTRACT

The invention concerns a light beam position detector with a detection window, for detecting a position of a striking light beam within the detection window, which detection window comprises a first PSD based on the lateral photoelectric effect, in particular with two output signals dependent on the striking position of the light beam, and an electronic readout circuitry for the PSD. The detection window further comprises at least a second PSD based on the lateral photoelectric effect, being aligned in a geometrical line in succession with the first PSD, so that the first and the at least second PSD define the detection window.

18 Claims, 6 Drawing Sheets

(56) References Cited

U.S. PATENT DOCUMENTS

| | | |
|---|---|---|
| 4,830,489 A | 5/1989 | Cain et al. |
| 4,907,874 A | 3/1990 | Ake |
| 4,976,538 A | 12/1990 | Ake |
| 5,215,465 A | 6/1993 | Marshall et al. |
| 5,422,643 A | 6/1995 | Chu et al. |
| 5,886,776 A | 3/1999 | Yost et al. |
| 6,133,991 A | 10/2000 | Ake |
| 6,171,018 B1 | 1/2001 | Ohtomo et al. |
| 6,172,742 B1 | 1/2001 | Yamazaki |
| 6,435,283 B1 | 8/2002 | Ohtomo et al. |
| 6,508,530 B1 * | 1/2003 | Conta et al. ............ 347/19 |
| 6,747,266 B2 | 6/2004 | Yamazaki et al. |
| 6,750,953 B1 | 6/2004 | Douglas |
| 6,784,408 B1 | 8/2004 | Cheung et al. |
| 6,831,263 B2 * | 12/2004 | Skurnik et al. ............ 250/208.2 |
| 7,012,237 B1 | 3/2006 | Ake |
| 7,307,738 B2 | 12/2007 | Winter et al. |
| 7,339,154 B2 | 3/2008 | Katayama |
| 7,372,011 B2 | 5/2008 | Green et al. |
| 7,394,527 B2 | 7/2008 | Essling et al. |
| 7,838,808 B1 | 11/2010 | Ake |
| 2003/0025068 A1 | 2/2003 | Gonzo et al. |
| 2003/0174305 A1 | 9/2003 | Kasper et al. |
| 2003/0222200 A1 * | 12/2003 | Skurnik et al. ............ 250/208.1 |
| 2005/0103974 A1 | 5/2005 | Hsiao |

FOREIGN PATENT DOCUMENTS

| | | |
|---|---|---|
| EP | 1 484 577 A1 | 12/2004 |
| EP | 1 972 890 A2 | 9/2008 |
| JP | 04046282 B2 | 2/2008 |
| WO | 2011/071366 A1 | 6/2011 |

* cited by examiner

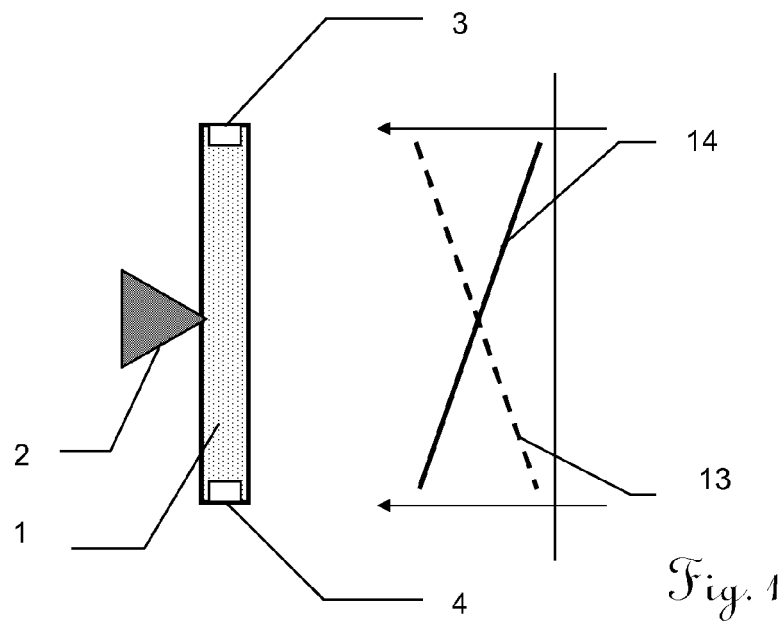
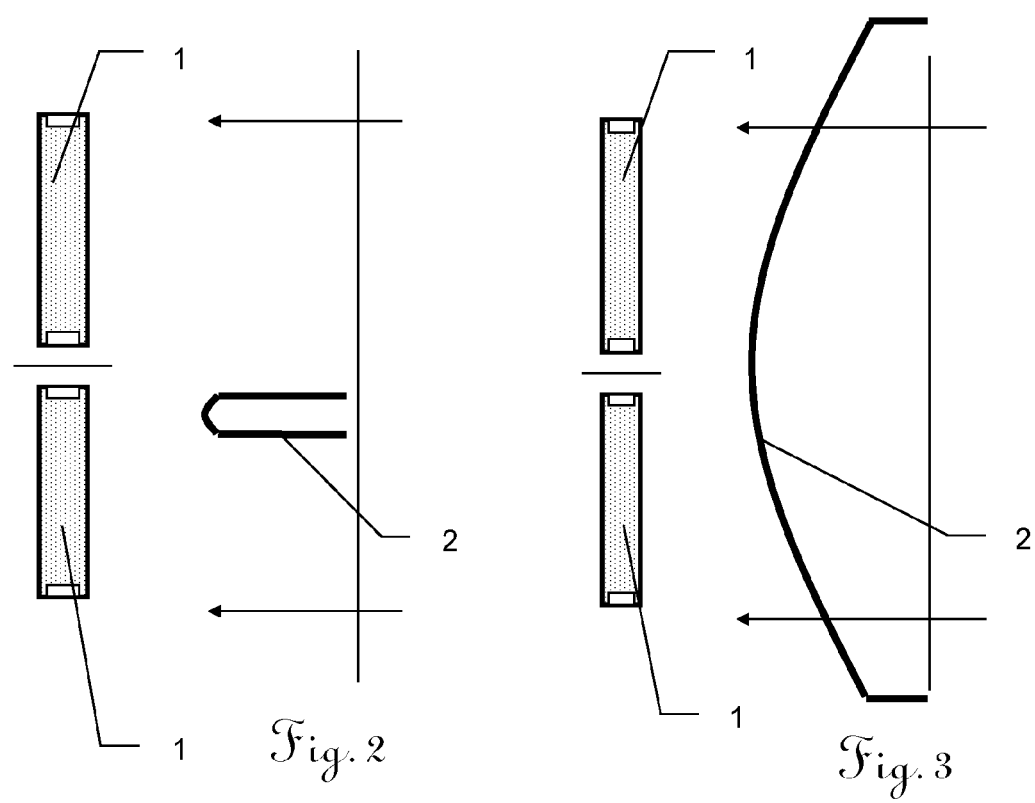

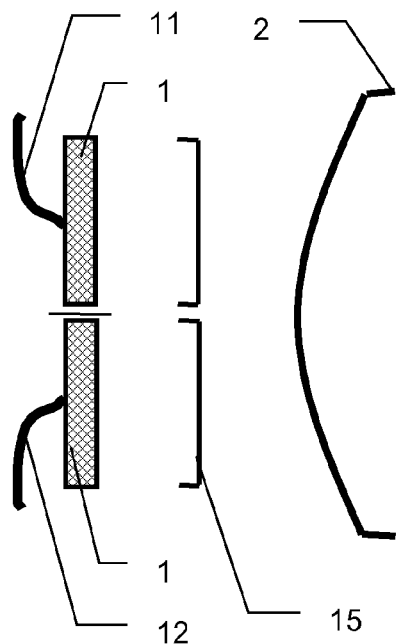
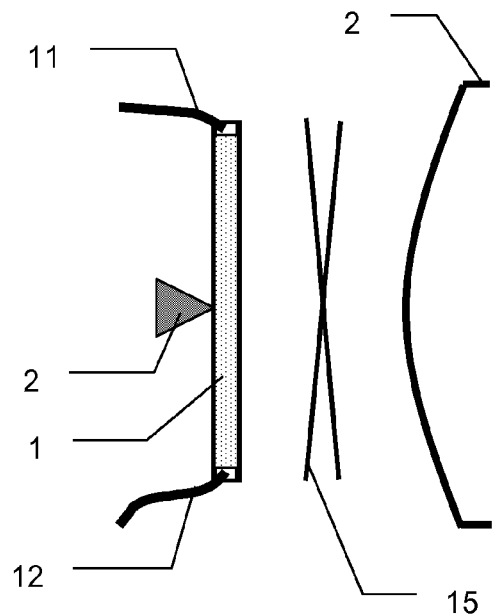
Fig. 4
Fig. 5
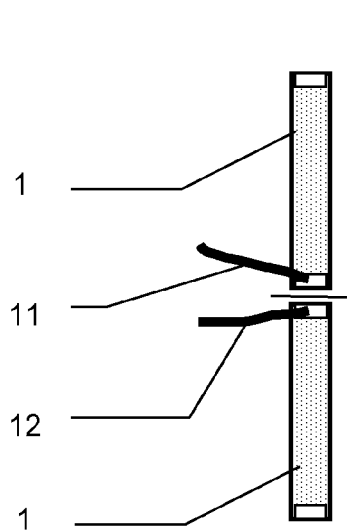
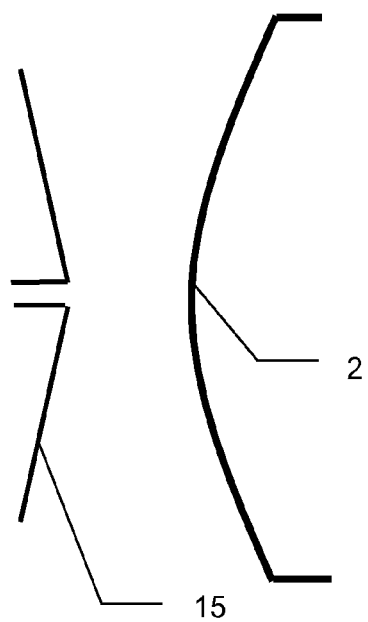
Fig. 6

MULTI PSD-ARRANGEMENT AND CIRCUITRY

FIELD OF THE INVENTION

The present invention relates generally to a light spot position measurement device, a laser levelling receiver with the light spot position measurement device and to a method of light spot position measurement.

BACKGROUND

In the technical field of laser leveling, a laser rotator or a line laser is used to span a leveling plane which can be horizontal, vertical or tilted by a desired angle. The laser plane is often detected by a laser receiver, which detects the striking position of the laser inside a detection window to determine the receiver's position relative to the laser plane. The detection window, or receiver window, is the area at the laser receiver device, which is embodied to detect the light beam, in particular the position of the light beam's striking point within the detection window for determining the relative position of the laser-beam's axis and the receiver device in at least one direction. In many embodiments, the center in the half of the length is the desired level of the laser beam and the receiver indicates a deviation from this ideal position by indicative or quantifying means. The electronic reception of the laser beam allows an extension of the range of the laser leveling, usability under sunlight conditions, etc. Many types of laser receivers are known, with many different functional, performance and cost advantages compared to their competitors. The devices can comprise many additional features like optical level indication, acoustic level indication, distance determination, angle determination etc., which are not the primary scope of the present invention.

Some examples of such laser leveling implementations are U.S. Pat. No. 6,435,283 showing a rotating single beam laser transmitter, or U.S. Pat. No. 4,756,617 showing a continuous 360° laser plane generated by directing a laser at a conical surface, wherein typically an amplitude modulated laser source is used. Those two principles of projecting a laser line are also referred to as line lasers with a scanning line or line lasers with a continuous laser line, wherein the light can be modulated.

A rotating or scanning laser beam transmitter produces a beam that sweeps past the receiver and generates laser pulses of short duration but of high bandwidth in the detection window. In contrast, continuous laser transmitters generate a continuous laser signal of a narrow bandwidth at the modulation frequency. Although the sensor element of the receiver (and many other parts of the receiver) can be the same for both types of laser levels, the signal conditioning and evaluation in the receiver is different. The invention presented herein relates to rotating beam transmitters, but is also valid for modulated continuous beam laser transmitters.

In many cases of use, the laser receiver is attached to a leveling rod or to machinery which has to be leveled. The point of intersection of the laser plane at the reception window of the receiver is determined by measuring the striking position of the beam's optical axis within the receiving window. This position is indicated to the user, in particular as a deviance from a desired striking position at the desired leveling position.

There are multiple techniques known to determine the striking position of the laser in the receiver window. One approach of determining the position of a light beam is by usage of photodiodes or arrays of photodiodes.

U.S. Pat. No. 3,649,122 describes a line of separate adjacent photo electric units connected in parallel to each other and connected in series with identical resistors. The photo-current measured between the thus resulting poles gives the position of the point at which the laser beam strikes the receiver relative to the length of the line of photo electric units. Light guides are used to increase the filling/density of the detection window with photo electric units. For the arrangement of the photo electric units, this receiver only yields a stepwise linear response.

U.S. Pat. No. 3,894,230 describes an aligned array of parallel photo detecting devices where each photo-detecting device corresponds to an increment in position. The receiver indicates which photo detection unit first receives a light signal above a predetermined level. A Plexiglas rod is aligned with the sensor array to form a cylindrical lens, increasing the amount of light falling onto the detection array. The apparatus further employs the use of optical filters to reduce the influence of ultra-violet light, bright sunlight or other sources of light. This receiver assumes that the laser beam is circular and that photo detecting units are sufficiently spaced apart. Therefore the range of detection of this receiver is limited.

EP 1,484,577 describes a receiver for amplitude modulated laser beams (100 kHz to 10 MHz) by an intermittent array of (parallel) photodiodes that are connected to a phase shifting circuitry. A light diffusing sensor window is arranged in front of the intermittent array of photodiodes. The light diffuser spreads the laser light in such a manner that when the laser beam impinges on the center between two photodiodes, both diodes are equally illuminated. By this structure this receiver can use fewer photodiodes; however this receiver is only partly linear.

U.S. Pat. No. 7,372,011 describes a linear array of (parallel) photodiodes with associated weighting circuits. The weighting circuits are used to determine whether the receiver has been struck by a laser beam or by a strobe light. To drain the low frequency current generated by sunlight, the receiver uses inductors referenced to ground.

U.S. Pat. No. 7,339,154 and JP 04046282 show a sensor stage with a parallel array of photodiodes weighted with a circuit based on an arrangement of resistors in series. The load resistors $R_h$ and $R_l$ are preferably dimensioned such that the sum of the weighing resistors is considerably larger than the load resistors.

Besides single photodiodes as used above, also BiCells are used, as dual photodiodes, placed on a rectangle with a typically long aspect ratio and which are electrically as well as optically separated by a diagonal, forming two congruent triangles (Bi-Cell). When the laser beam strikes at the upper/lower side of the rectangle, the first photodiode covers the laser beam with a small/large area, whereas the second photodiode is covered with the remaining large/small area. The relationship between the difference of both signals and the sum of both signals is linear. For example, U.S. Pat. No. 4,676,634 shows a BiCell and alternative two photocells in butt to butt arrangement with a beam averaging and deadband selection for on-grade stabilization.

U.S. Pat. No. 4,756,617 describes the usage of so called BiCells for a linear determination of the position where the laser beam impinges on the receiver. The use of inductors is described for bypassing the DC and low frequency signals to ground (sunlight protection). Further, the use of amplitude modulated laser beams is described to increase the peak strength of the laser beam without increasing the regulated RMS (root mean square) value which allows an increase of the maximum distance range of the receiver.

U.S. Pat. No. 4,830,489 describes a BiCell based laser receiver for linearly determining the relative height of the laser beam. The azimuth position of the receiver is determined at the rotator by means of a back reflected signal by the receiver. A radio is used to communicate the azimuth position as well as the distance of the rotator to the receiver. For distance measurement, time of flight as well as phase shift measurement methods are proposed.

U.S. Pat. Nos. 4,907,874 & 4,976,538 both describe a modified BiCell sensor through a parallel arrangement of the individual interdigitated photo elements combined in two resulting elements with two signals.

U.S. Pat. No. 6,133,991 describes multiple BiCell sensors stacked on top of each other with different sensor shapes and sensor arrangements to reduce the shading effect. For effecting a linear sensor array concatenating the same sensor element, the contributing sensor elements are electronically used in parallel and requiring for each a separate signal processing path. In an alternative configuration, different elements are required at each position and multiple sensors are electrically interconnected in parallel.

U.S. Pat. No. 6,747,266 describes an arrangement using an optical filter with a lenticular part capable of expanding the laser beam in scanning direction and a diffusing part capable of diffusing an expanded laser beam with the advantage that a wide laser beam as well as a narrowly focused (scanning) laser beam can be detected by a divided Bi-cell sensor.

Also, the usage of lightguides in leveling laser receivers is known. For example in DE 195 40 590 an N-type or V-type line shaped optical detection unit is described. The detection units can consist of arrays of photo electrical sensors, bundles of optically transmitting glass or plastic fibers which are aligned in a line at the detection window or a specially made bar consisting of optical material able to conduct the orthogonally impinging laser light to a photo electric sensor at the end of the bar. By using the bars in N-shape or V-shape and measuring the time difference between receipt of signals on either bar, the relative height of the laser beam on the optical receiving elements is determined.

U.S. Pat. No. 7,394,527 and US 2003/0174305 both describe a rotator with at least two signal beams in a given relationship to each other for determining the distance from the receiver to the rotator. The receiver is designed for time resolved reception of these signal beams. Furthermore a receiver is described with two photo sensors on both ends of a light conductor which allows measuring the point where the light beam impinges the light conductor. Using two receivers arranged in a fixed distance allows determining the distance to a rotator by only a single beam.

Differentiating two signal generators by emitting at the receivers can take place via different rotational frequencies, coding of the emitted signals, selection of a suitable emission spectrum and similar.

Another known element for the determination of a light point is a PSD (short for Position Sensitive Device), which is well known in industry and is for example used in triangulation sensors as device to detect the position of a (reflected) laser beam.

PSDs according to the understanding of the present application are devices like those based on the lateral photoelectric effect, also referred to as isotropic PSDs or Lateral Effect Photodiodes (LEP) or MOS-Type PSDs. As the presented readout circuitries imply, in particular non-segmented PSD substrates are used, which have two opposed, balanced outputs. The signals on the outputs are dependent on the position of a light beam on the PSD's active surface. The two output signal are reversely dependent on the position (such output behavior is sometimes also referred to as symmetrical output). Fast-readout CCD or CMOS arrays, which are sometimes also referred as PSDs—since they can also be used to determine the position of a light spot projected on them—are not meant, in particular since their electrical connections and readout characteristics are different.

For ease of understanding, the PSDs in the explanations of the present text are one-dimensional PSDs, although a skilled person is aware of the fact that the same principles are also applicable on a second direction of two dimensional PSDs, wherefore also the evaluation of two dimensional PSDs is part of the present invention.

Although the usage of PSDs for position detection has advantages, the main problem is their low saturation threshold, wherefore, in outdoor conditions with bright sunlight, PSDs have not been used thus far. In particular in outdoor laser leveling applications, PSD sensors suffer from the fact that they easily saturate under sunlight and—relative to photodiodes—have lower signal strength at far distances between the receiver and the laser source. For those reasons, PSD sensors have not been used in a commercial implementation of a laser receiver for construction sites.

The signal response of the PSD is somehow similar to that of a BiCell arrangement: providing two continuous signals that increase/decrease with changed position of the incident laser beam. However, there are several technical differences in the use of a BiCell compared to a PSD, for example:

1. There is a phase delay between the signals created by each photodiode of a BiCell. This phase delay has disadvantages during the digitalization of a pulse and is cause to some non linearity.
2. The triangular shape of each diode in a BiCell causes some non linearity when being struck by a round or elliptical laser beam because of the difference in point of gravity of the triangular sensor areas and the laser beam intensity distribution.
3. BiCells typically require a larger detection area than PSDs, which results in higher sensor cost and more sunlight saturation.
4. When the BiCell is not aligned orthogonally to the laser beam, and a part of the sensor is covered by the receiver housing, the sensor will give a wrong height reading. This is also referred to as shading effect. Many solutions have been proposed to solve this inherent BiCell sensor problem.

In leveling applications using "intelligent leveling rods", it is desired to cover large height differences, for example 10 cm or more.

Standard, off the shelf PSD devices with long detection areas are not available, for example PSDs having an active detection length greater than 5 cm or 7 cm or even more than 10 cm. Those few devices available suffer from saturation problems by background light etc. and can not achieve the desired performance which is required for a leveling receiver.

SUMMARY

An object of the present invention is to provide an improved laser receiver, in particular for leveling applications.

It is an object of the present invention to achieve larger detection windows and greater leveling distances. Long range leveling requires an increased sensor length and this requires a stronger suppression of interferences, backlight, etc., as those effects increase with the sensor length, wherefore maintaining a sufficient sensitivity is contradictory to an increase of the PSDs length. Maintaining a sufficient sensitivity is also a contradictory requirement to an increase of backlight suppression capabilities of the state of the art suppression circuitries for leveling applications.

It is another object of the present invention to provide an improved light spot position measurement device, in particular in a PSD-based receiver for leveling applications, preferably using less complex and modular components.

Another object of the invention is to provide a position sensor-readout circuitry with improved backlight saturation suppression.

A particular object of the invention is to provide a PSD-readout circuitry for reading out a multiple PSD arrangement.

Another object of the invention is also to provide a laser receiver for levelling short and long range distances.

A further object is to provide a method and an electrical readout arrangement for a multiple PSD arrangement, capable of detecting the position of a wide span of laser spot diameters, in particular also of spot diameters being larger than the active length of a single PSD, preferably also with a linear readout of the position.

A further object of the invention is to provide a laser receiver for usage in high backlight conditions.

Yet another object of the invention is to provide a laser receiver with an increased receiver window length, in particular with high position accuracy.

Yet another object of the invention is to increase the receiver resolution for alignment and positioning applications.

Yet another object of this invention is to increase the detection range of the optical elements by minimizing the signal loss over the background and sunlight suppression circuitry.

The present invention relates to a light beam position detector, for detecting a position of a striking light beam within a detection window, which comprises a first Position Sensitive Device (PSD) based on the lateral photoelectric effect, in particular with two—preferably opposed—output signals dependent on the striking position of the light beam as photo sensitive element with at least two opposed, light beam position weighted, electrical outputs.

Further, the detection window comprises at least one second PSD aligned in a geometrical line in succession with the first PSD, wherein the first and the at least second PSD defines the detection window. In particular, the at least first and second PSD are electrically interconnected in series to form a linear sensor array.

The position of a striking light beam within a detection window is evaluated by means of an electronic readout circuitry for the PSDs.

The first and the at least one second PSD are arranged in a row next to each other, as a line of PSDs, with their direction of position sensitivity arranged in the direction of the detection window's length and thereby defining the detection window, in particular by their summed up lengths and the width of one of the PSDs. The detection window comprises a geometrical series arrangement of at least two PSDs; it can also comprise some additional optical components like a wavelength filtering window, a lens-shaped component, light guiding means, etc.

As a further aspect of the present invention, the light beam position detector can also comprise a readout circuitry with a variable, in particular alterable, readout interconnection of the first and the at least second PSD. The readout circuitry can configure the beam position detector into at least two modes with a different positional weighting of the light beam position within the detection window by a variation of the readout circuitry, in particular by altering the interconnections of the outputs of the PSDs and/or adjustment of the load impedances applied to the PSDs outputs.

As already mentioned above, a laser receiver with a long measurement range is desired. Longer measurement ranges require long receiver windows and sensors, as the leveling beam diverges proportional with the range/distance to the laserbeam emitter. Extending the measurement range by choosing longer sensor elements like long Bi-Cells or PSDs has the drawbacks of increased sensor capacitance and higher backlight generated currents, which have to be suppressed. Increasing the bias voltage of the sensor elements helps to increase the backlight level at which saturation occurs, however at the expense of power consumption. Furthermore there is a physical limit for the bias voltage of the sensor element, which also limits the maximum length of the sensor element where sufficient backlight suppression is achievable.

According to the present invention, the length of the laser receiver's receiving window for position determination is extended beyond the maximum physical length of the contributing sensor elements through a serial concatenation of multiple sensor elements.

Single PSDs for light position determination are well known, but are not per se applicable for worksite laser leveling, especially due to their limited size and the saturation effects as explained above. The arrangement according to the invention is not only a simple elongation of the sensor length by a subsequent arrangement of multiple sensors.

An ideal light beam position detector for leveling requires an accurate position determination of a wide range of light beam diameters with sufficient sensitivity and backlight suppression. The beam diameters at the receiver can therein even exceed the length of a single sensor element of the series arrangement, in particular for covering a wide range of distances in leveling applications. A straight forward series arrangement of multiple sensors would still suffer from the same saturation effects as one long sensor, whereby not much advantage would be gained.

Preferably, the accuracy of position determination has to be in the millimeter range or below, wherein also linearity of the position readout is an important aspect. The prior art readout and backlight suppression circuitries would—due to their load impedances—cause nonlinearities and signal damping, which would be beyond a useful level and would disrupt linearity. In particular in a taped series arrangement of sensors, the prior art circuitry is not applicable.

A skilled person would therefore expect that a series arrangement of sensors would not lead to any obvious advantages, in particular not solve the technical problems of laser leveling, wherefore he would not consider applying it. That is also why PSDs are not used in prior art, although PSD devices have been known and available for a long time.

In particular, a combination of a series arrangement of multiple sensor elements with a suitable filter-structure/resonator at each terminal, as an additional aspect of the present invention, gains additional advantages in backlight suppression and maintaining linearity. Also the further additional aspect of a switched sensor readout arrangement, dedicated for far or near distances, according to the present invention, helps to furthermore achieve longer light position sensors for a wide range of beam diameters with advanced detectability and position accuracy. In addition, the geometrical arrangement of multiple sensor elements in a line does not require additional signal processing circuitry for each sensor element added, as the elements can electrically be connected in series. This allows for easier scaling of the sensor length compared to the prior art.

This invention describes a simple and cost efficient laser position sensing device with a long receiver window and an advantageous setup and readout circuitry to overcome the above mentioned disadvantages like saturation, nonlinearity and/or low sensitivity.

The presented circuitry is in particular advantageous when using position sensitive devices PSDs based on the lateral photoelectric effect, for the linear detection of the laser beam position on the receiver. The proposed circuitry and signal processing method is however not limited to the use of these sensors. In particular the interconnection and filtering circuitry according to the present invention can also be advantageously used with Bi-Cells or other sensors.

In the following the various aspects of the present invention are described for a laser receiver using PSD sensors, not excluding alternative sensor means with similar characteristics and similar problems.

BRIEF DESCRIPTION OF THE DRAWINGS

The method according to the invention and the devices and setup according to the invention are described or explained in more detail below, purely by way of example, with reference to working examples shown schematically in the drawings. Specifically, FIG. 1 shows an idealized sensor response of a PSD element according to the invention;

FIG. 2 shows an abstracted view of an exemplary beam profile of a laser signal at near distances;

FIG. 3 shows an abstracted view of an exemplary beam profile of a laser signal at far distances;

FIG. 4 illustrates an exemplary embodiment with a far laser signal received by two photodiodes;

FIG. 5 illustrates an exemplary embodiment with far laser signal received by single PSD or BiCell;

FIG. 6 illustrates an exemplary embodiment with a far laser signal received by two PSDs in a serial arrangement according to the present invention;

DETAILED DESCRIPTION

Figure 7:
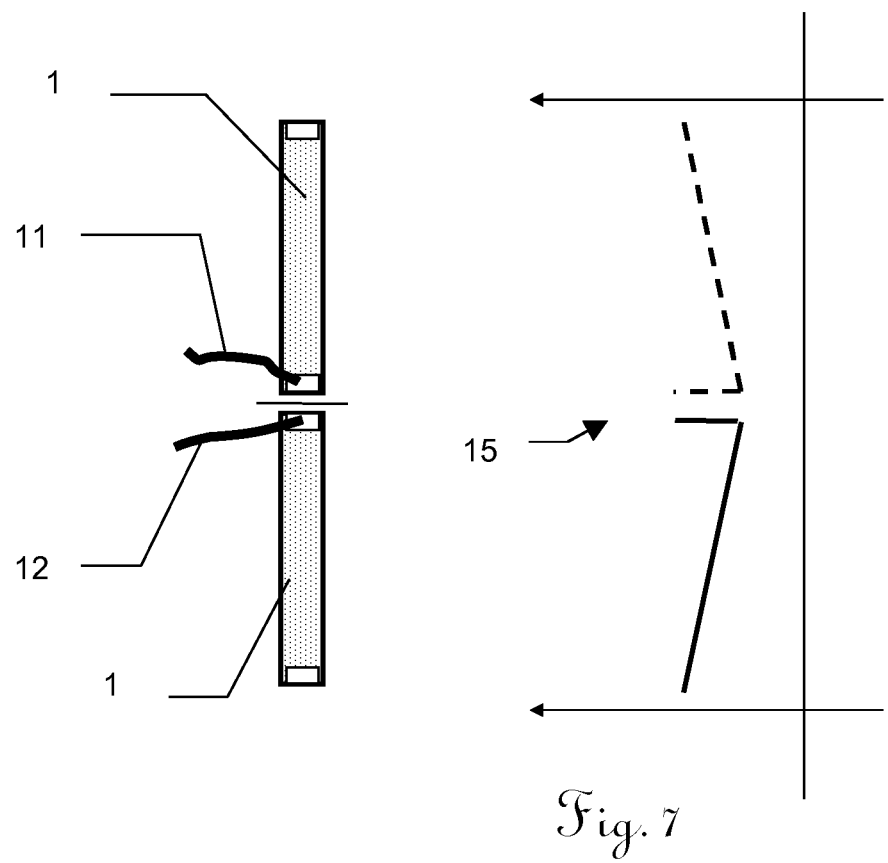
FIG. 7 shows a far distance readout arrangement of two PSDs according to the present invention.

The diagrams of the figures should not be considered as being drawn to scale.

FIG. 1 illustrates a schematic sketch of the functional principle of a PSD according to the present invention. The PSD 1 has an electrical connection at the upper end 3 and at the lower end 3. A light beam 2 is striking the PSDs surface results in the idealised sensor response 13 at the upper connector 3 respectively the idealised sensor response 14 on the lower connector 4, which is dependent on the impingement position of the light beam 2 along the sensors active area.

FIG. 2 shows a narrow light beam 2 applied to two sensors 1. The beam e.g. a laser beam, has a sharp spot characteristic on the device, as illustrated by the intensity profile of the beam 2. This is a typical example of a laser spot in a leveling application at close distances, where the position of the optical axis of the laser as center of gravity of the spot's intensity on the sensor needs to be determined. At close distances, typically a small laser beam 2 falls on a larger sensor and a PSD sensor 1 can discern the center point of gravity of the whole laser beam very well.

FIG. 3 shows the light intensity distribution over the sensor area as it typically is the case in a far distance leveling application, where the laser beam's divergence has broadened the laser beam to an intensity distribution as illustrated by the intensity profile of the beam 2. As at far distances, the laser beam 2 is taller then the sensor 1, the intensity distribution within the laser beam which has to be determined for beam position measurement, is more difficult to detect.

In case the laser beam 2 is larger than the sensor 1, the sensor needs to determine the center point of gravity without seeing the whole beam. In particular, if the beam 2 has an even intensity distribution, it is impossible to determine the center of the beam 2 with some degree of accuracy. Therefore also long receiver windows are required to preferably cover the whole beam.

The intensity distribution of the laser beam 2 at far distance has been modelled with a parabolic intensity distribution over the beam diameter. At the edge of the beam, the intensity is assumed to have dropped 50% compared to the intensity in the center of the beam.

Using this model, the centering performance of the possible sensor concepts can be evaluated according to the following formulas:

FIG. 4 illustrates a detector with two photodiodes aligned in a vertical direction. Therein, no positional weighing of the signals is present as indicated by the two rectangular weighing profiles 15 at both of the sensors 1.

$$S_l = \int_{C-\frac{L}{2}}^{C} (1 - ax^2)dx$$

$$S_r = \int_{C}^{C+\frac{L}{2}} (1 - ax^2)dx$$

With
L=Length of the PSD
C=Position of the center of the PSD, relative to the center of the beam $$a = p \cdot \left(\frac{2}{\Phi}\right)^2,$$

a factor describing the intensity profile of the laser beam
p=power drop at the edge of the laser beam
$\Phi$=beam spot diameter
$S_r$=signal at the right hand side 11 of the PSD/Photodiode
$S_l$=signal at the left hand side 12 of the PSD/Photodiode FIG. 5 shows a single PSD 1 with a weighing function 15 resulting in signals according to the following formulas:

$$S_r = \int_0^L (1 - ax^2) \cdot \left(\frac{x}{L}\right) dx$$

$$S_l = \int_0^L (1 - ax^2) \cdot \left(\frac{L-x}{L}\right) dx$$

FIG. 6 shows two PSDs in Butt-Cell arrangement with weighing 15 of the signal in opposite directions over the series arrangement of the PSDs 1.

$$S_r = \int_{C-\frac{L}{2}}^{C+\frac{L}{2}} (1 - ax^2) \cdot \left(-\frac{x}{L} + \frac{C + \frac{L}{2}}{L}\right) dx$$

$$S_l = \int_{C-\frac{L}{2}}^{C+\frac{L}{2}} (1 - ax^2) \cdot \left(\frac{x}{L} - \frac{C + \frac{L}{2}}{L}\right) dx$$

Using this model, the centering sensitivity of a Butt-Cell arrangement of two PSDs is 50% higher compared to a same arrangement using Photo Diodes.

Nevertheless, there are also shortcomings of the Butt-Cell arrangement in certain constellations, which can be overcome according to the additional aspects of the present invention for achieving a wider applicability.

Figure 8:
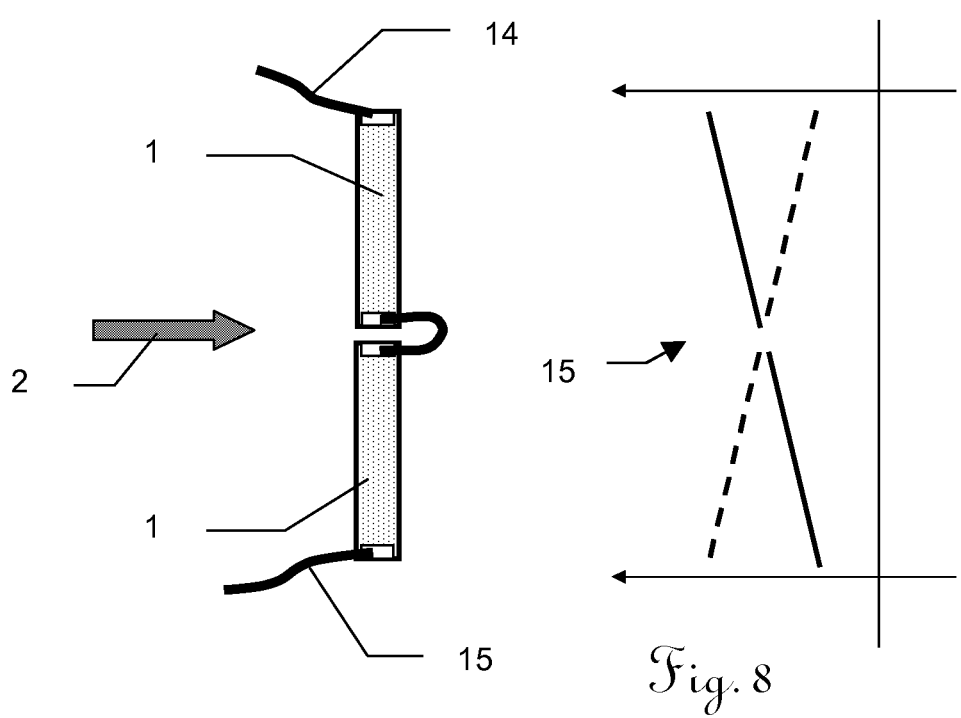
FIG. 8 shows a near distance readout arrangement of two PSDs according to the present invention.

On the one hand, the Butt Cell arrangement of two PSDs results in spot size dependence at close distance. This can be overcome—according to the additional aspect of the invention—by switching the two PSD sensor arrangements from Butt-Cell as shown in FIG. 7 to a concatenated linear sensor arrangement (sensors connected in series) at close distances, as shown in FIG. 8. By switching the interconnections of the two PSDs into a series connection, an ideal, long, singular PSD is formed, if not for the small gap between the sensors. A smaller gap between the PSDs results in better linearity of the device.

On the other hand, the Butt Cell arrangement of two PSDs results in lower contribution of the signals at the outsides of the receiver and thus in a lower detectability (lower signal strength) in this area of the detector compared to a conventional photodiode arrangement.

This can be overcome by blocking out sunlight and other disturbances, like swiveling lights and strobe lights, whereby the detectability is increased. This aspect will be further elaborated below. This also helps to overcome the saturation effects of the long PSD formed by the series arrangement, which would—without further precautions—suffer from the same saturation effects as one lone PSD. A blocking of saturation as explained below can overcome this effect, in particular as the series arrangement allows a saturation-draining at each tap of the serial connection, whereby the suppression can be further increased.

Strong sunlight falling onto the photosensitive element generates many electrons. These electrons saturate the sensor if they are not drained away effectively. PSD manufacturers therefore recommend to electronically influence the amount of sunlight that the sensor is able to cope with by increasing the bias voltage and by reducing the load resistance of the sensor.

So, to leak away sufficient electrons generated by strong sunlight, a low load resistance is beneficial. However, the load resistance also affects the signal amplitude of the laser pulse striking the sensor and decreases the linearity of the sensor, whereby those two aspects are contradictory.

Figure 9:
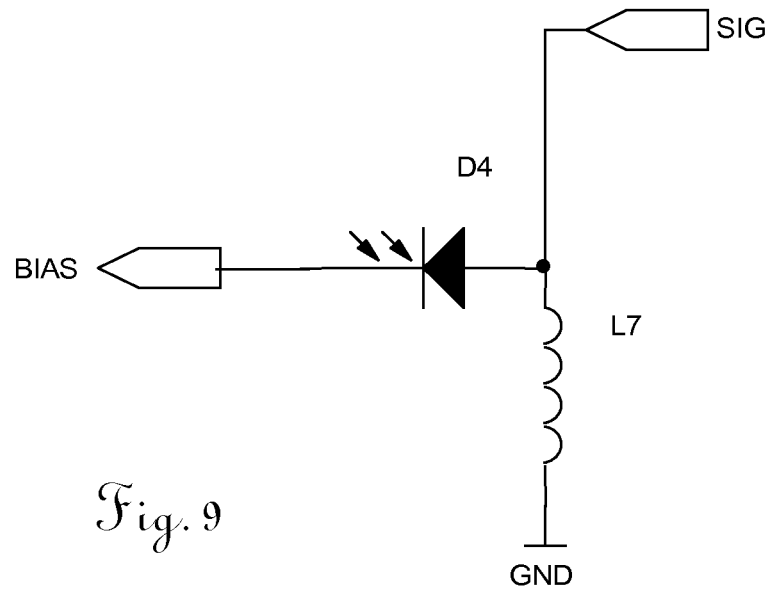
FIG. 9 shows a readout circuitry for background suppression of prior art.

The common method to increase the signal strength and suppress the sunlight induced saturation in prior art is to use an inductor L7 in parallel to the sensor D4, as illustrated in FIG. 9. For example, the documents U.S. Pat. Nos. 7,012,237, 5,886,776 and 4,756,617 mention this approach.

Therein the impedance Z of the inductor L7 is $$Z = j\omega L,$$

with $\omega$: frequency and L: inductance.

The achievable impedance is limited by the physical realization of the inductor L7 which is affected by the series resistance of the inductor combined with the capacitance of the wires in parallel.

The duration of the laser pulse $\Delta t$ in a rotational laser leveling application is given by $$\Delta t = \frac{\text{Laser Spot Size}}{2\pi \cdot D \cdot f}$$

with: D=Distance between laser rotator and sensor and
f=rotating frequency of the laser rotator.

Assuming a distance of 100 m, a laser spot size of 25 mm and a rotating frequency of 10 Hz, the duration of the laser pulse is $$\Delta t = \frac{25}{2\pi \cdot 100000 \cdot 10} = 4 \ \mu s.$$

Combined with the width of the sensor and the rise time of the sensor, the resulting total pulse duration observed on an oscilloscope is approx 25 µs. This results in a frequency response of at least 20 kHz. The impedance of an ideal inductor (50 mH) at this frequency response is 6 k Ohm, which is in a range where the readout linearity and/or sensitivity of the sensor is already perceptibly influenced by this impedance.

Figure 10:
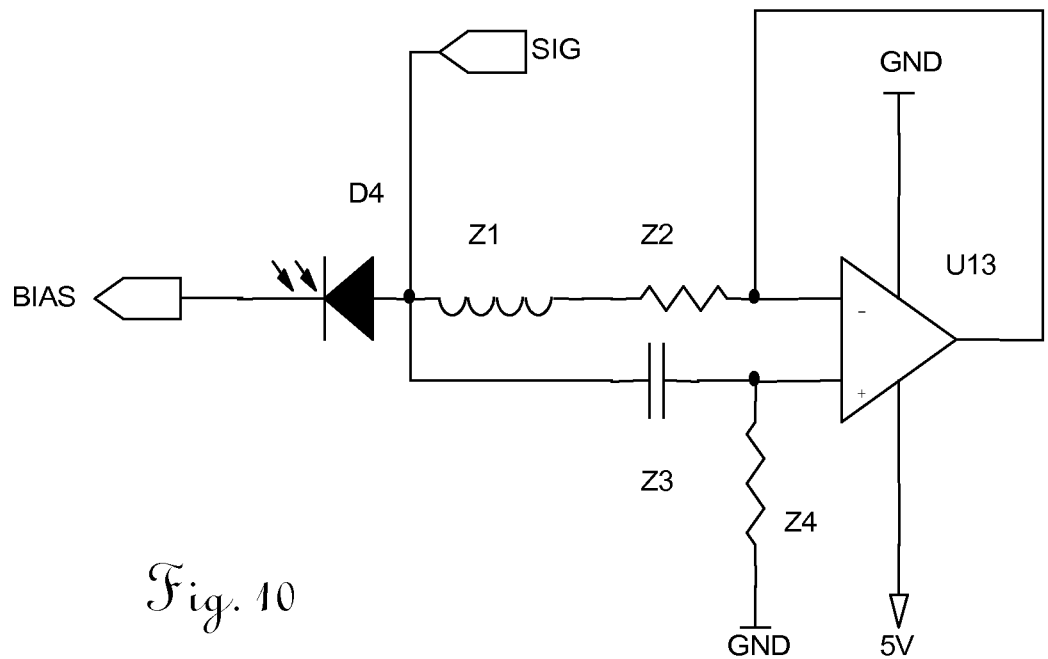
FIG. 10 shows an exemplary embodiment of a readout circuitry for background suppression according to an aspect of the present invention.

A better structure to suppress the sunlight saturation according to an aspect of the present invention is shown in FIG. 10 and explained below. This structure represents an active resonator, whose resonance can be adjusted by changing the impedance of the constructing components. The sensor D4 is drained by a low load impedance of the active circuitry at low frequencies, while the active circuitry has high impedance at the signal frequencies of interest, allowing a high sensitivity and linearity of the sensor readout. By an active electronic component of the active resonator, an active suppression of backlight and corresponding saturation effects can be achieved, which provides better characteristics than a prior art suppression by passive components, in particular better impedance-frequency characteristics, especially for a backlight suppression at an output of a PSD.

The exemplarily shown circuitry of FIG. 10 comprises an inductor Z1 and a series resistance Z2 (which can also be embodied by the inherent series resistance of the inductor) and a capacity Z3 and Resistor Z4, connected to the operational amplifier U13. As illustrated in detail below, the circuitry has a frequency response as impedance-frequency characteristic with a low impedance at low frequencies (e.g. suppressing sunlight or 100/120 Hz from artificial lights), a very high impedance at the frequency at which the leveling light is received (the actual signal of interest), and a still high impedance at frequencies above (e.g. for noise suppression). The most important aspect is the lowpass characteristic for draining electrons to avoid saturation by background light. Nevertheless, strictly speaking, the circuitry in fact results in an (asymmetric) bandpass filtering with a center frequency preferably tuned to the frequency of the received laser light's amplitude modulation (due to intensity modulation or beam rotation. As explained below, the circuitry is also tunable by adjustable or switchable electrical components to modify the frequency response in impedance and/or center frequency. A skilled person in operational amplifier circuitries is aware of the fact that there are also other equivalent component arrangements possible, resulting in the same or similar load characteristics and frequency responses. Also embodiments of higher order or additional HF-suppressions are known in the art. The present embodiment illustrates the underlying principle of an active resonator and in particular considers the aspect of preferably low material costs.

An adjustment of the parameters of the active resonator is even possible online, e.g. by electronic potentiometers, transistors, switchable components in the circuit etc. Thereby a tuning of the circuit to achieve optimized sensing characteristics for the actual operating conditions can be achieved.

Figure 12:
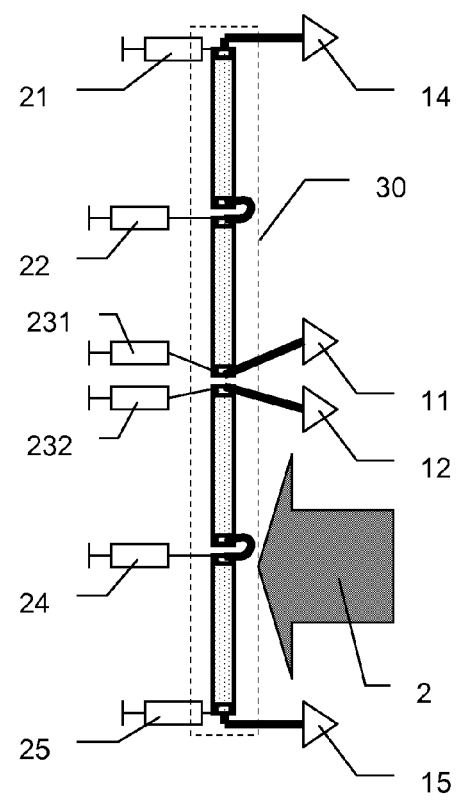
FIG. 12 shows an exemplary embodiment of a light position detection unit, configured for far distance mode readout according to an aspect of the present invention.

The impedance of the resonator structure shown in FIG. 12 is given by:

$$Z_{in} = \frac{(Z_3 + Z_4) \cdot (Z_1 + Z_2)}{Z_1 + Z_2 + Z_3}.$$

When using the following components:

$Z_1 = j\omega L$, $Z_2 = R2$, $Z_3 = 1/j\omega C$, $Z_4 = R4$, the impedance of the resonator is:

$$Z_{in} = \frac{(1 + j\omega CR4) \cdot (R2 + j\omega L)}{1 - \omega^2 LC + j\omega R2C}.$$

A discussion of this formula reveals the following:
At $\omega = 0$:

$Z_{in} = R_2$.

For good sunlight and DC suppression $R_2$ will be chosen to be low, e.g. $R_2 = 100$ Ohm.
With $$\omega = \frac{1}{\sqrt{L \cdot C}},$$

with typically L=50 mH, C=1 nF $\omega = 140 \cdot 10^3$, and with a frequency f≈20 kHz and $R_4$=1 MegaOhm, the impedance results to:

$$Z_{in} = R_4 + \frac{L}{R_2 C} + j\sqrt{\frac{L}{C}}\frac{R_4}{R_2}$$

$$|Z_{in}| = 70 \cdot 10 \wedge 6 \; Ohm$$

At $\omega = 1/R_2 C$, with $R_4 \gg R_2$ and $R_2^2 \cdot C \ll 1$:

$Z_{in} \approx R_4 = 1 \cdot 10^6$ Ohm

At $\omega = \infty$, $Z_{in} \approx R_4 = 1 \cdot 10^6$ Ohm

The resonator structure shown in FIG. 10 offers several advantages compared to the impedance of the circuitry shown in FIG. 9:

a. Significantly higher impedance at middle frequencies (20 kHz). For example, approximately $5 \cdot 10^3$ Ohm for the inductor vs. approximately $70 \cdot 10^6$ Ohm for the resonator structure. This results in much stronger signal pulses at far distances, whereby a better detectability is achieved.
b. Maintaining a very low impedance at low frequencies (<1 kHz) and thus providing an excellent suppression against other external noise sources like neon lights, swivel lights and strobe lights, resulting in improved robustness. An additional strobe light suppression circuitry, as e.g. described in U.S. Pat. No. 7,372,011, is therefore not required.
c. Ability to control the response curve by changing resistors and capacitors without great effort.
d. Ability to use low quality inductors with a high series resistance whereby low cost parts can be used for implementing the resonator.
e. When concatenating multiple PSD sensor elements in series, the high impedance of the resonator structure results in a highly linear detector.

For symmetry, each of the signal terminals of the PSD can be equipped with the resonator structure.

Figure 11:
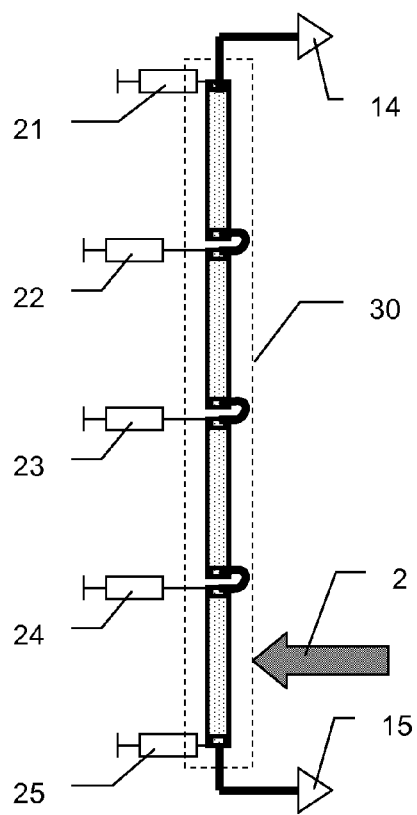
FIG. 11 shows an exemplary embodiment of a light position detection unit, configured for near distance mode readout, according to an aspect of the present invention.

FIG. 11 illustrates an exemplary real world embodiment of a light position sensor according to the present invention in a readout configuration for near distances with a small light spot diameter.

The laser beam 2 impinges on the last sensor element 1 in the row of the receiver's detection window 30, the impedance at the bottom signal amplifier 15 which is in parallel to the bottom amplifier impedance, is the impedance 25. For the impedance 25 not to have a negative effect on the signal strength, the impedance 25 must be chosen greater than the impedance of the bottom signal amplifier 15. For symmetry, the impedance 21 is chosen equal to the impedance 25. The impedance—as seen from the position of the beam 2 in direction of the top amplifier 14, is the impedance 24 parallel to the impedance 23, parallel to the impedance 22, which is in parallel to the top amplifier 14 impedance. To avoid linearity distortions of the evaluated signal, the impedance 24 parallel to the impedances 23, 22 and 21 must be similar to the impedance 25 (25≈24//23//22//21). Therefore, the impedances 24, 23 and 22 are preferably greater than the impedance 21 (and 25).

The above mentioned linearization requirement when concatenating multiple sensors can be fulfilled by choosing appropriate components in the above mentioned active resonator structures.

For switching over to the embodiment FIG. 12 showing a far distance configuration of the same sensor arrangement as in FIG. 11, the previously present impedance 23 must be split into two structures with the impedances 231 and 232, which in parallel form the impedance 23. In addition two amplifiers 11 and 12 at the middle connectors, in parallel the impedances 231 and 232 respectively, are present.

A practical circuit for near and far distances comprises both configurations FIG. 11 and FIG. 12 in a switchable manner. A decision whether a near or far beam is present can be made manually or dependent on the intensity distribution over the sensors. The taping and splitting of the But-Cell arrangement does not necessarily have to be done in the middle of the series arrangement, but can be at any one, some or all sensor interconnections, in particular if above impedance considerations are applied accordingly.

The reconfiguration of the readout circuitry changes the weighting method of a linear sensor arrangement to achieve a linear sensor at close distances with small narrow beams and a sensor with superior centering sensitivity at far distance with wide laser beams. By adjustments to the active resonator structures, the weighting method can be adjusted to an arbitrary polynomial.

For leveling receivers, which are used to align the center of the laser receiver to the optical axis of the received laser beam, a preferred embodiment of the split Butt-Cell readout configuration is a split point in the middle of the row in case of an even number of PSD sensors. For odd numbers of sensors, the readout circuitry can for example be embodied with two split points, by evaluating the upper and lower receiver(s) in Butt-Cell configuration and use the central PSD either as an individual, single PSD or alternatively even skip the central PSD, resulting in a Butt-Cell configuration with a gap in the middle, in particular as in this readout configuration, the received beam diameter will larger than the length of a single PSD.

Two or more individual channels for analog signal processing, which are illustrated by the amplifiers 11, 12, 14, 15, will in general not produce exactly the same results as they will always have at least slightly different input-output-characteristics. In the present case especially signal offsets and signal amplification values can vary in-between different channels. Even if the channels are integrated in the same chip or built by specially matched components, the tolerances of the components involved will result in slightly different behavior of the channels. This can be compensated by a factory-calibration during production, but effects like aging, thermal drifts, etc. are not fully covered by such an approach.

As further aspect of the present invention, the amplifications and offsets of the different hardware channels 11, 12, 14, 15 can be determined dynamically during operation and therefore also compensated in the following signal evaluation. In particular an offset-value can be online determined in an idle state, when no striking light beam—which's position has to be determined—hits the detection window. The amplification scaling can be online determined by a switching of the signal to be detected alternately to a first and a second (or even more) channel. By this transpose of readout channels of the readout circuit, scaling differences between the channels can be evaluated. In an embodiment of the present invention, where there are multiple signal channels which are (or should be) identical, this can for example be achieved by switching the upper and lower outputs of the PSDs to different readout channels, which can be done by means of the alterable readout interconnections, if they are designed appropriately, e.g. by a multiplexer circuit. According to the differences of the measured signals for the same PSD output applied to different channels, amplification differences can be determined. Similar can be done with the two different channels 11, 12 tapping the outputs in-between the PSDs 1 in FIG. 12. In particular in embodiments according to the invention where the interconnections of the PSDs 1 are alterable anyway for achieving switchable positional weighting characteristics, this can be done without much additional effort.

Figure 13:
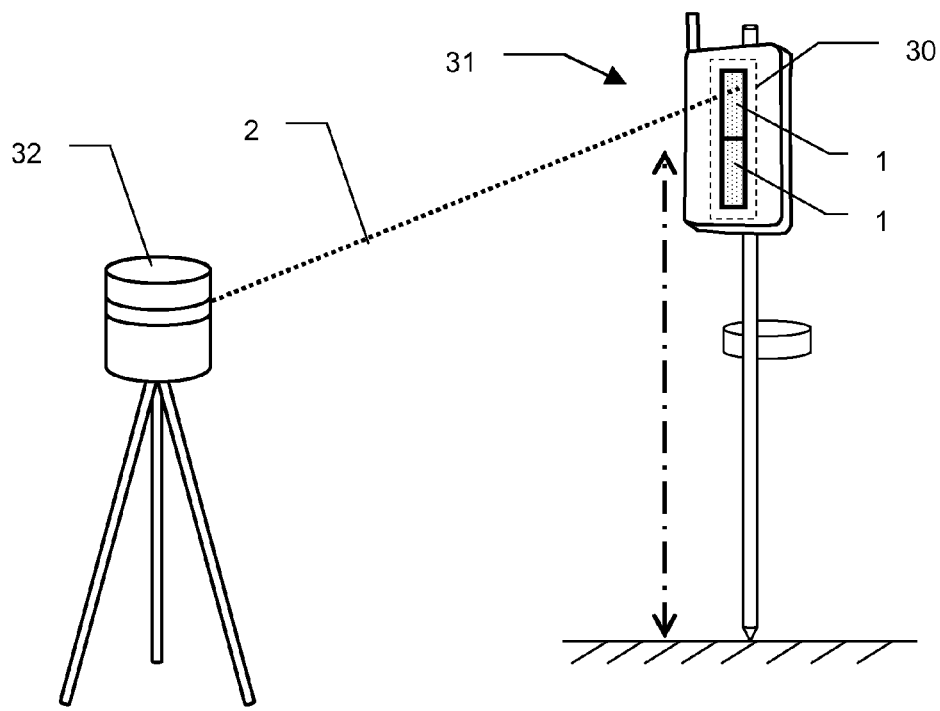
FIG. 13 shows a first example of a laser levelling application with a laser receiver with a light beam position detector according to the present invention.

FIG. 13 shows a first exemplary leveling application with a laser receiver 31 according to the invention, which receives a laser beam 2 from a rotational laser 32. The receiver's detection window 30 comprises the at least two PSDs 1 according to the present invention, which are interfaces according to described further aspects of the present invention as explained above. A typical example for such an application is concrete working, where a plane concrete surface has to be built, such as a building's ceiling. In this example, the laser transmitter 32 and the laser receiver 31 are in general not as far apart that the divergence of the laser has broadened the projected laser spot at the receiver window 30. Due to the small spot size—according to one of the further aspects of the present invention—an electrical series connection of the PSDs is chosen.

Due to the high linearity of the position determination according to the invention, an exact leveling can be achieved and also a measurement of the deviation from the desired level within the range of the long detection window—according to the present invention—can be made, e.g. to build tilted sections, steps or the like, say e.g. in an off-level-range of 10 cm or even more. As the mentioned concrete leveling is done outdoors in bright sunlight conditions (or at night under spotlights) the suppression of saturation of the PSD by those sources of constant or low frequency light is an aspect which is solved—according to the present invention—by a splitting of the detection window into multiple PSDs with higher saturation thresholds and even improved—according to one of the further aspects of the present invention—by the active resonator circuit used for suppression which can be used at some or all of the PSDs' electrical outputs. Apparently, the laser plane from the transmitter 32 can also be spanned in a tilted or upright position for applications other than leveling a plane, like drilling holes in a vertical line for fitting bolts to attach pipes or steel structure.

Figure 14:
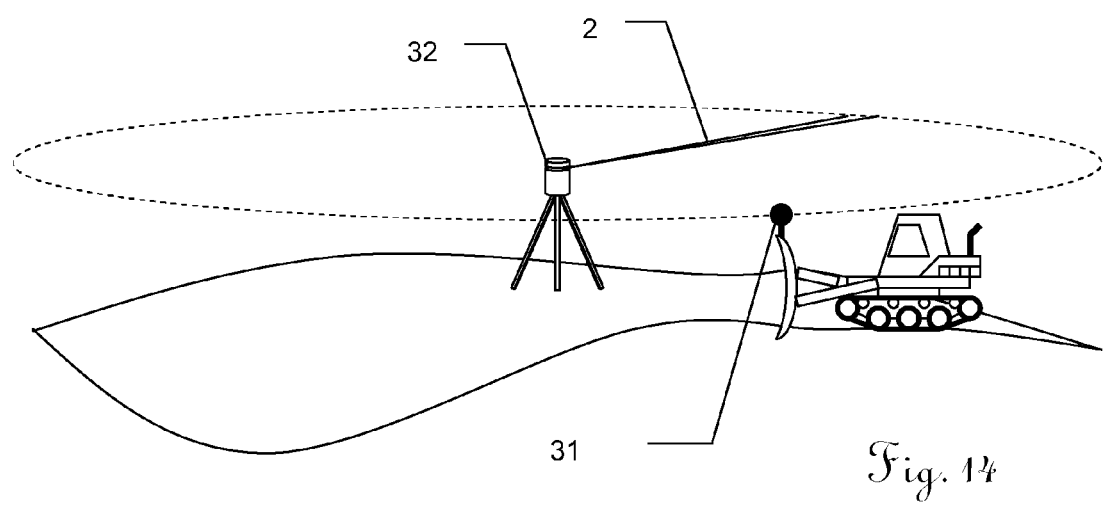
FIG. 14 shows a second example of a laser levelling application with a laser receiver with a light beam position detector according to the present invention.

FIG. 14 shows a second exemplary leveling application, wherein a laser rotator 32 is emitting a laser beam 2 spanning a leveling plane for the dozer 33 which is equipped with a laser receiver 31 with a detector according to the present invention. Due to the long distance between the emitter 32 and the receiver 31, the beam 2 has broadened, for example, to a width of 5 cm or 7 cm. To cover the full with of the beam for accurate leveling, the detection window has to be of at least that length to cover the whole beam. According to the present invention, the electrical Butt-Cell arrangement of the sensors is used to achieve high centrical sensitivity for an exact leveling at far distances due to resulting positional weighting of the detector. Also the above mentioned saturation suppression according to the further aspect of the invention can be applied in this application.

A person skilled in the usage of the equipment referred to herein will be aware of many other application scenarios.

What is claimed is:
1. A light beam position detector, comprising:
 a detection window configured to enable detection of a position of striking light beam within the detection window, the detection window including:
 a first Position Sensitive Device (PSD) based on the lateral photoelectric effect, with two output signals that are dependent on the striking position of the light beam;
 an electronic readout circuitry for the first PSD;

a second PSD based on the lateral photoelectric effect and aligned geometrically in line in succession with the first PSD, such that the first PSD and the second PSDs define the detection window.

2. The light beam position detector according to claim 1, wherein:
the first PSD and the second PSDs are electrically interconnected in series to form a linear sensor array.

3. The light beam position detector according to claim 1, wherein:
the electronic readout circuitry provides an alterable readout interconnection of the first PSD and of the second PSD.

4. The light beam position detector according to claim 1, wherein:
the readout circuitry is capable of switch between:
an electrically concatenated series arrangement of the first PSD and the second PSDs, thereby electrically forming a single long PSD; and
an electrically split series arrangement with at least the first PSD on one side and the second PSD on another side, by electrically forming the first PSD and the second PSD in a But-Cell arrangement, providing substantially centrically weighting of the light beam position along the detection window.

5. The light beam position detector according to claim 4, wherein:
the electrically formed single long PSD provides substantially linear weighting of the light beam position along the detection window; and
the But-Cell arrangement provides substantially centrically weighting of the light beam position along the detection window.

6. The light beam position detector according to claim 4, wherein the readout circuitry comprises:
at least one active resonator circuit for an active backlight suppression which includes an operational amplifier, wherein:
the active resonator circuit is connected to at least one of the first PSD and the second PSD and is configured to drain low frequency photo-induced currents from the connected PSD to ground; and
each output of the first PSD and the second PSD is connected to at least one active resonator structure.

7. The light beam position detector according to claim 6, wherein:
the active resonator circuit is configured to provide a low impedance to an output of the first and second PSDs at low frequencies and higher impedance at high frequency, with an impedance below 1 kOhm at frequencies below 1 kHz and an impedance above 1 MegaOhm at a modulation frequency of the striking light beam intensity at the detector.

8. The light beam position detector according to claim 6, wherein:
the active resonator structure has an adjustable impedance-frequency characteristic enabled by at least one adjustable or switchable electrical component included in the active resonator structure, wherein an impedance of the active resonator structure at an upper and/or lower end of the impedance-frequency characteristic is adjustable.

9. The light beam position detector according to claim 4, wherein:
the readout circuitry is capable of being altered dependent on a diameter of the striking light beam in the detection window, from the concatenated series arrangement for light beam diameters smaller than one of the PSDs, to the split But-Cell arrangement for light beam diameters larger than one of the PSDs, according to an automatically determined intensity profile of the striking light beam in the detection window.

10. The light beam position detector according to claim 1, wherein:
the readout circuitry is configured to determine offset and/or amplification errors of analog signal processing channels of the readout circuit by transposing readout channels of the readout circuitry by alterable interconnections; and
the channels include the active resonator structure.

11. A laser alignment system comprising:
a laser projection device for emitting a laser plane; and
a light beam position detector according to claim 1, for determining a striking position of the laser plane in the detection window for a laser leveling application.

12. Electrical circuitry for evaluating an arrangement that includes the first PSD and the second PSD of the light beam position detector according to claim 1, wherein the electrical circuitry:
operates by a switchable readout interconnection of the first PSD and the second PSD in the readout circuitry of claim 1; and
includes at least one active resonator structure that has at least one operational amplifier and is connected to at least one of the first PDS and the second PSD for suppressing low frequency saturation effects, with an adjustable impedance-frequency characteristic.

13. A method for light spot position determination on a laser receiver having at least two Position Sensitive Devices (PSDs), the method comprising:
applying a light beam to an active surface of the PSDs, the laser beam having a modulated light intensity;
generating at least two electrical signals dependent on the position of the light beam on the active surface according to the lateral photoelectric effect; and
determining the position of the light beam according to the electrical signals by a readout circuit, including:
evaluating a geometrical line arrangement of at least two PSD sensors, which form a detection window for the light spot; and
adjusting a positional weighting characteristic of the position sensitivity of the geometrical line arrangement by altering interconnection of the at least two PSDs in the readout circuitry.

14. The method according to claim 13, further comprising:
altering the readout circuitry by switching the electrical interconnection of the PSDs between:
an electrical series connection used for light spots smaller than the active surface of one of the PSDs; and
a split But-Cell configuration in which the series arrangement is split in at least two separated parts with at least two electrically separated intermediate tappings, used for spot sizes larger than an active area of one of the PSDs.

15. The method according to claim 13, further comprising:
taping an electrical outlet of at least one of the PSDs by an active resonator circuit for suppressing low frequency saturation effects by draining current with frequencies below a modulation frequency of the light beam from the PDS; and
providing higher load impedance at the modulation frequency of the light beam at least once at the electrical outputs of each of said at least two PSDs.

16. The method according to claim 15, wherein taping the electrical outlet is performed by taping the electrical output with the active resonator providing low load impedance at low frequency.

17. The method according to claim 15, further comprising:
reconfiguring a positional weighting characteristic of the active resonator by adjusting electrical components of the active resonator by adjusting an impedance of the active resonator structure at an upper and/or lower end of a impedance-frequency characteristic of the active resonator.

18. A computer program product with program code being stored on a non-transitory machine readable medium, the program code being configured to automatically execute and operate the method according to claim 13 when the program code is executed at a digital computation unit of a laser levelling receiver.

* * * * *